Oct. 16, 1962 L. C. SCHMIERER ETAL 3,058,658
CONTROL UNIT FOR DIGITAL COMPUTING SYSTEMS
Filed Dec. 22, 1958
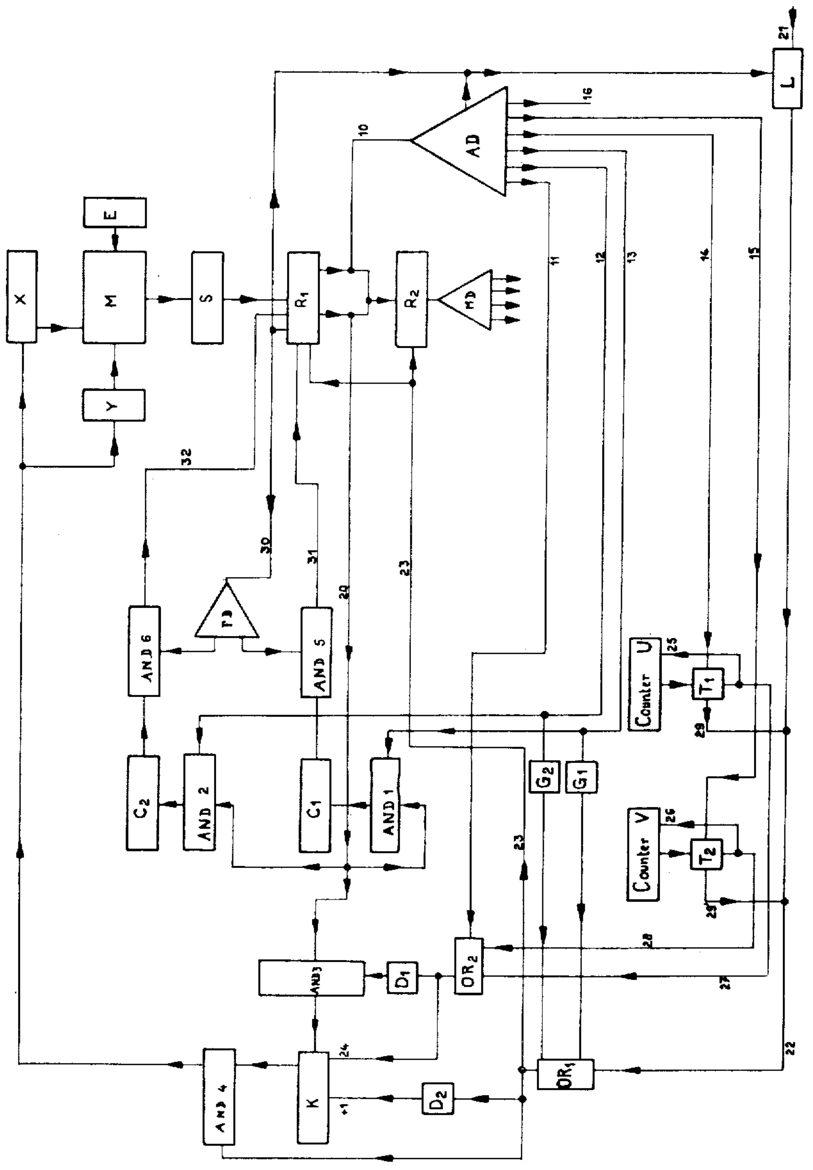

3,058,658
CONTROL UNIT FOR DIGITAL COMPUTING SYSTEMS

Livia C. Schmierer, Neuilly Plaisance, and Jacques H. F. Valin, Pavillon sous Bois, France, assignors to Societe Nouvelle d'Electronique, Paris, France Filed Dec. 22, 1958, Ser. No. 782,266
8 Claims. (Cl. 235—157)

This invention pertains to improvements in the control unit of parallel digital calculating apparatus and relates more particularly to an improved control system for reducing the time of inactivity of an electronic calculating machine and consequently to increase considerably its operating speed.

It is useful to recall some definitions of terms used in the art of computing practice. Each of the "instructions" or "words" stored in the memory unit of a computer as per the invention consists of a certain number of "digits" and is organized in three parts: an algebraic message portion, hereinafter referred to as the operation part, and a functional message portion referred to as the address part and the modification part. The address part gives the address where can be found the operand on which will be effected the operation defined by the operation part. The modification part contains information for effecting a modification inherently internal to the control unit. Such modifications are generally made on the address part and, more rarely, on the operation part. Other functions can also be carried out in the control unit itself without making use of the other elements of the machine. These include amidst other some types of built-in checks, conditional or unconditional jumps, modification of instructions and modifications of the content of a so-called index register. All these functions will be hereinafter referred to as internal functions.

The function of transferring an instruction will be called "Transfer" and that of selecting the next instruction from a specified storage location will be called "Jump." The signal corresponding to the end of an arithmetic operation will be referred to as "execution signal."

The definition of above terms between quotation marks as well as those used hereinafter are to be found in the IRE Standards on Electronic Computers—Definitions of terms, 1956.

An electronic digital computer performs generally as follows:

All the instructions are stored in the fast memory unit;

An instruction counter commands a sequential transfer of these instructions into an instruction register;

An instruction decoder associated with this register interprets the operation part of said instruction and its selected output line, one of a plurality, conditions all control circuits required to execute the current instructions.

It is known that the time intervals necessary to perform these various steps are quite different. The duration of the performance of an instruction is variable within wide limits and depends on the nature of the function. However, this duration is always longer than that of a transfer from a high-speed memory to a register. During the performance of the instruction, therefore the instruction register remains inactive.

On the other hand, certain types of commands must be performed before decoding the instruction in the instruction register. These are the above-mentioned internal functions whose execution depends only on the control unit and keeps inactive all the other elements of the computer.

This invention relates to a system capable of reducing these periods of inactivity by taking into account the fact that the fastest operation which can be made on an instruction consists in transferring it from one register to another. As a consequence, the control function has been shared between an auxiliary control unit and a main control unit so that they may work independently and simultaneously.

The auxiliary control unit contains one or more auxiliary registers in which are placed one or more instructions which are used either to perform internal functions in said auxiliary registers or as spare instructions to be transferred later on into the instruction register of the main control unit, or as a single variable-length instruction stored partially in the main instruction register and partially in one or more of said auxiliary registers.

Thus, during the performance of an instruction stored in the instruction register, one or more internal functions can be executed by interpreting the content of the auxiliary register in its associated decoders.

One of these internal functions consists in the modification of one part or of the totality of an instruction by addition of the content of one of a plurality of index registers. This function is very important when it is necessary for example to perform many cycles of identical operations on numbers placed in adjacent addresses of the memory. Another internal function is the conditional jump function which consists in the verification, by the testing of a counter, of the number of times a given set of operations has been effected. Still another internal function consists in the unconditional jump function.

More generally, all kinds of internal functions that are not to be performed in the arithmetic unit or computer can be performed in the auxiliary control unit.

Such a splitting of the control function presents many advantages. As said above, and in the present state of the art, it is faster to transfer an instruction from one register to another one than to transfer same from a high-speed memory into a register. During the transfer time of an instruction to the auxiliary register, the principal placed in the instruction register can be performed. Consequently, the inactive time of the computer is reduced to the duration of the transfer of an instruction from the auxiliary instruction register into the main instruction register instead of being that of the transfer from the memory into the instruction register.

It is therefore the object of the invention to provide a reduction in the time of inactivity of a digital computing apparatus and consequently to increase its speed of operation by sharing the control function of the machine between an auxiliary control unit performing internal functions and a main control unit performing arithmetic functions, so that the two control units may be operating at the same time while carrying out different functions.

It is a further object of the invention to provide a proper sequencing of the operations so that the auxiliary control unit contains always the instructions concerning the following operation even in case of a conditional internal command.

The novel features which are believed to be characteristic of the invention, as to both its organization and its method of operation, together with further objects and advantages thereof will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

The sole FIGURE of the accompanying drawing represents a functional block diagram of the circuits relative to the invention. It represents only the control and the fast memory units of the computer system shown by way of example. The input and output as well as any slow memory units included in the system have been omitted as they can vary widely in nature and are not essential to the description. The arithmetic unit or computer proper has also been omitted but the output lines of decoder MD are connected to it as well as conductor 21 which carries the execution signal from the computer to the control system.

On the drawing, the memory unit is represented at M together with its selection registers X and Y, and its input and output registers E and S. The register of the main control unit, or main instruction register, R2 is associated with the main decoder MD whose function it is to deliver the necessary commands to the arithmetic unit.

The auxiliary control element is shown, in the accompanying drawing, as provided with only one instruction register R1 with which is associated: first, the auxiliary decoder AD, which interprets the operation part of an instruction, and second the modification decoder FD which interprets the modification part of an instruction. These two decoders deliver commands pertaining to the internal functions and it is well understood that the number, design and capacity of such decoders associated with the auxiliary instruction register depend essentially on such internal functions as can occur in the computation art.

The command signals delivered by decoder AD actuate the "AND 1," "AND 2," "AND 3" circuits through which part of the instruction stored in register R1 is transferred over conductor 20 to the other registers of the auxiliary control unit. One of these additional registers is the counting register K which stores the address information relating to the next instruction to be called for in memory M and thus serves as a selector for identifying that instruction in response to the functional portion of a message stored in register R1. The "AND 3" circuit which controls the transmission of that new address is actuated when a signal appears on output line 11 of decoder AD. Another type of register is represented by the index registers of which two are shown in the drawing, namely C1 and C2. Their function is to store a part of the instruction previously stored in R1. The "AND 1," "AND 2" circuits which control the transmission of that part of the instruction that is stored in R1 are actuated when a signal appears on output lines 12 and 13 of decoder AD.

The command signals delivered by decoder FD actuate either the '"AND 5" or the "AND 6" circuit through which the content of register C1 or C2 is transferred back to register R1 over conductors 31 and 32 in order to modify the information stored there.

For example, the message contained in one of these registers can be, when ordered so by a signal originating from FD, added to an instruction stored in R1 so that the auxiliary control unit may perform many cycles of identical operations on numbers placed in adjacent addresses of the fast memory unit M.

A parallel digital computer whose control system is designed in accordance with the invention operates as follows. When an operation performed in the arithmetic unit is being completed, this unit sends back an execution signal over conductor 21 to the control system. A lock-in switch L placed at the input of said control system controls the sequencing of the program by blocking the transmission of this signal until R1 contains an instruction ready to be used by R2.

When all the internal functions contained in the instruction stored in R1 have been performed in the auxiliary control unit, switch L opens the transmission path and the execution signal is sent over conductor 22 to the "OR1" circuit, normally in its open state, and then on the one hand to the counting register K, after a delay occurring in the delay circuit D2, and on the other hand to the "AND 4" circuit which opens and allows the transfer into the memory unit M of the address stored in K.

That address is the one at which there will be found the next instruction to be interpreted. The signal delayed in D2 is then applied to the counting register K whose count is thus increased by one unit to modify the address information stored therein. Simultaneously the execution signal is transmitted over conductor 23 in order to clear R2 of a first message already stored therein to transfer to register R2 a second message, i.e. the instruction present in R1, and to transfer into R1 a third message, i.e. the new instruction coming from the memory M.

The operation of the computer according to the invention will now be described for three different internal functions. This choice is non-limitative.

The unconditional jump function is performed as follows. When a signal appears on output line 11 of the auxiliary decoder AD, it passes through the "OR 2" circuit and is applied on the one hand to the counting register K over conductor 24 for clearing said register, and on the other hand to the delay circuit D1 for actuating the electronic switch "AND 3." This allows for the transfer, over conductor 20, of the address part of the unconditional jump counting to the instruction counter register K through said switch "AND 3."

The function of the delay circuit D1 is to allow the clearing of register K before the address part of the unconditional jump instruction reaches that register. The next instruction corresponding to this new address is then transferred from the memory unit M to register R1.

The modification function is performed as follows:

When a signal appears on one of output lines 12 and 13 of the auxiliary decoder AD, it actuates one of the internal signal generators G1 and G2 and also one of the circuits "AND 1" and "AND 2" which opens, thus allowing the transfer of part of the instruction stored in R1 into index register C1 or C2 over conductor 20. It is also possible that these registers receive information directly from the memory whose address is specified by an instruction stored in R2. An internal execution signal is supplied by G1 or G2 and transmitted through the "OR1" circuit, and then initiates the same operation as the execution signal received on conductor 22 from the computer.

When a subsequent instruction in register R1 contains modification digits, these are interpreted in the FD decoder whose output lines deliver an actuating signal to either the "AND 5" or the "AND 6" switch. The actuated switch opens and the content of the corresponding index register C1 or C2 is added to the instruction. The same modification digits block the lock-in circuit L. It is well understood that the auxiliary control unit can contain a greater number of index registers and the auxiliary decoder a corresponding number of output lines.

The conditional jump function is performed as follows:

When a signal appears on one of the output lines 14 and 15 of AD, it is transmitted to the register T1 or T2 of cycle counter U or V whose count must be verified. If this count differs from zero, as is normally the case, its associated register delivers a signal which, applied to the counter, reduces its count by one. Simultaneously, a signal is transmitted on conductor 27 or 28 to the "OR 2" circuit for resetting the count of K to zero. The cycle of operations is thus automatically resumed and the address of the first instruction of the cycle is transferred into the counting register K through the "AND 3" switch which has been actuated by the same signal which reset K to zero but with a delay imposed by the D1 circuit.

If the count of U or V is equal to zero, its associated register delivers an internal execution signal on conductor 29 or 29' for initiating the above-mentioned sequence of operation.

What is claimed is:

1. In a digital computing system having storage means for retaining coded information applied thereto, main instruction-register means connected to receive from said storage means combinations of coded signals constituting functional and algebraic message portions, and a computer adapted to perform calculating operations in response to instructions from said main register means corresponding to an algebraic message portion stored therein, the combination therewith of control means including:

auxiliary instruction-register means connected to receive messages from said storage means;

selector means operative under the control of said auxiliary register means, in the presence of a first message in said main register means and a second message in said auxiliary register means, for identifying a third message in said storage means in response to a functional portion of said second message during performance of a calculating operation by said computer in response to an algebraic portion of said first message; and signal-responsive means operable by an execution signal from said computer indicative of the completion of a calculating operation for clearing said main register means of said first message and thereafter initiating a transfer of said second message from said auxiliary register means to said main register means and a transfer of said third message from said storage means to said auxiliary register means, thereby enabling said computer to operate on an algebraic portion of said second message during transfer of said third message and identification by said selector means of a further message in said storage means.

2. In a digital computing system having storage means for retaining coded information applied thereto, main instruction-register means connected to receive from said storage means combinations of coded signals constituting functional and algebraic message portions, and a computer adapted to perform calculating operations in response to instructions from said main register means corresponding to an algebraic message portion stored therein, the combination therewith of control means including:

auxiliary instruction-register means connected to receive messages from said storage means;

selector means operative under the control of said auxiliary register means, in the presence of a first message in said main register means and a second message in said auxiliary register means, for identifying a third message in said storage means in response to a functional portion of said second message during performance of a calculating operation by said computer in response to an algebraic portion of said first message;

circuit means connected to said computer for receiving therefrom an execution signal indicative of the completion of a calculating operation;

blocking means under the control of said auxiliary register means for inhibiting the transmission of said execution signal to said circuit means during operation of said selector means; and signal-responsive means connected to said circuit means for operation by said execution signal upon inactivation of said blocking means for clearing said main register means of said first message and thereafter initiating a transfer of said second message from said auxiliary register means to said main register means and a transfer of said third message from said storage means to said auxiliary register means, thereby enabling said computer to operate on an algebraic portion of said second message during transfer of said third message and identification by said selector means of a further message in said storage means.

3. The combination according to claim 2 wherein said selector means includes an additional register for storing, preparatorily to transmittal to said storage means, address information forming part of said functional message portions; decoding means connected to said auxiliary register means and operative in response to an address-changing signal stored therein for clearing said additional register; transmission means between said auxiliary register means and said additional register for transferring new address information from the former to the latter; and delay means controlled by said decoding means for rendering said transmission means effective after said additional register has been cleared.

4. The combination according to claim 3 wherein said selector means further includes counting means operable by said decoding means in response to a conditional address-changing signal stored in said auxiliary register means, and signal-generator means operative under the control of said counting means upon attainment thereby of a predetermined count for clearing said additional register and actuating said delay means.

5. The combination according to claim 2 wherein said selector means includes an index register for storing function-modifying information, transfer means connected to said index register and to said auxiliary register means for transmitting to the latter said function-modifying information, and decoding means responsive to a modification signal stored in said auxiliary register means for rendering said transfer means effective.

6. The combination according to claim 2 wherein said selector means includes an additional register for storing, preparatorily to transmittal to said storage means, address information forming part of said functional message portions; decoding means connected to said auxiliary register means and operative in response to an address-changing signal stored therein for clearing said additional register; transmission means between said auxiliary register means and said additional register for transferring new address information from the former to the latter; first delay means controlled by said decoding means for rendering said transmission means effective after said additional register has been cleared; and second delay means connected between said circuit means and said additional register for changing its setting in response to said execution signal after transmittal of said address information to said storage means.

7. The combination according to claim 6 wherein said selector means further includes counting means operable by said decoding means in response to a conditional address-changing signal stored in said auxiliary register means; signal-generator means operative under the control of said counting means upon attainment thereby of a predetermined count for clearing said additional register and actuating said delay means; and a connection from said signal-generator means to said second delay means for changing the setting of said additional register upon the setting of said counting means differing from said predetermined count.

8. The combination according to claim 6 wherein said selector means includes an index register for storing function-modifying information, input means controlled by said decoding means for introducing said function-modifying information into said index register, transfer means connected to said index register and to said auxiliary register means for transmitting to the latter said function-modifying information in response to a modification signal subsequently appearing in said auxiliary register means, and signal-generator means connected to said second delay means and operative under the control of said input means for changing the setting of said additional register upon introduction of said instruction-modifying information into said index register.

References Cited in the file of this patent

UNITED STATES PATENTS 2,914,248 Ross et al. ____________ Nov. 24, 1959